No. 838,069. PATENTED DEC. 11, 1906.
W. BAUERMEISTER.
MACHINE FOR USE IN THE MANUFACTURE OF CHAIN LINKS.
APPLICATION FILED NOV. 3, 1905.

3 SHEETS—SHEET 1.

Witnesses
Benj. Finckel
Alice B. Cook

Inventor
William Bauermeister
by Finckel & Finckel
his Attorneys

No. 838,069. PATENTED DEC. 11, 1906.
W. BAUERMEISTER.
MACHINE FOR USE IN THE MANUFACTURE OF CHAIN LINKS.
APPLICATION FILED NOV. 3, 1905.
3 SHEETS—SHEET 2.
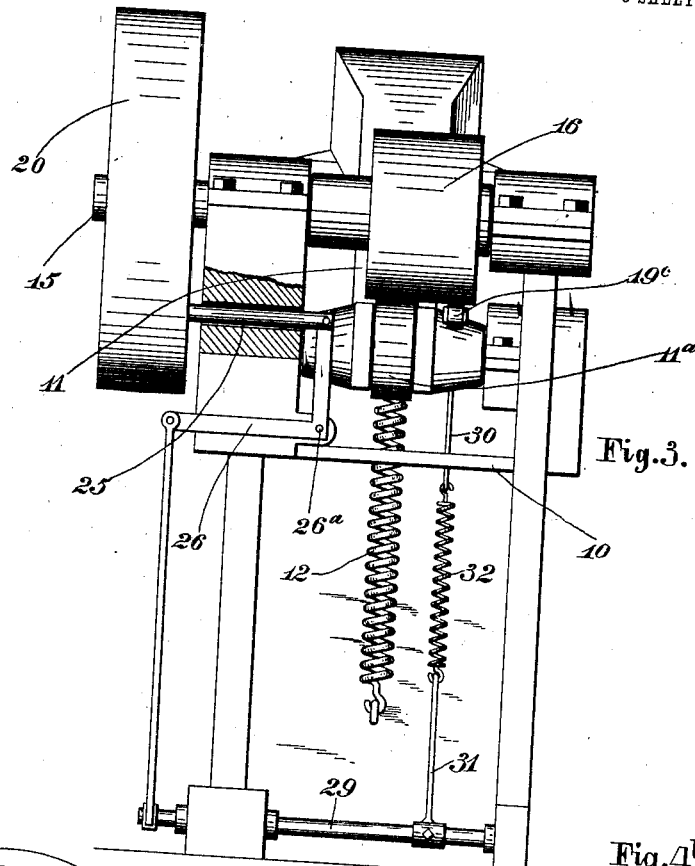
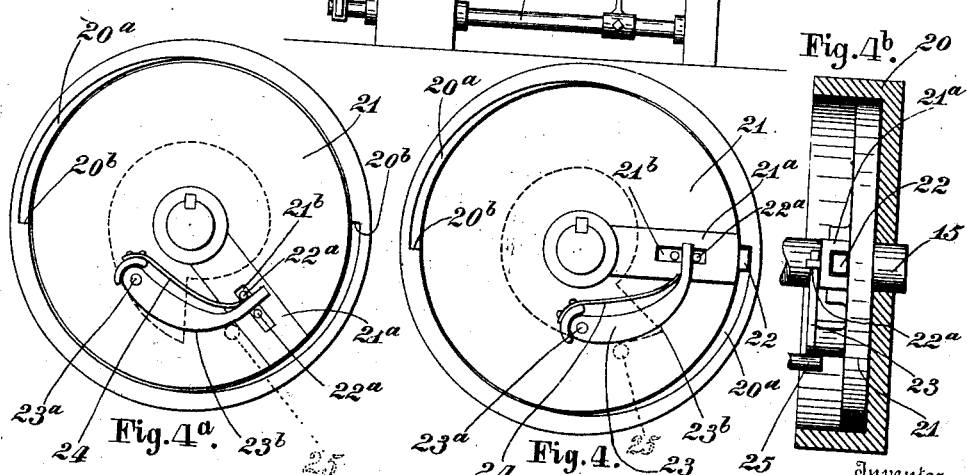
Witnesses
Benj. Finckel
Alice B. Cook.
Inventor
William Bauermeister
By Finckel & Finckel
his Attorneys No. 838,069.

PATENTED DEC. 11, 1906.

W. BAUERMEISTER.
MACHINE FOR USE IN THE MANUFACTURE OF CHAIN LINKS.
APPLICATION FILED NOV. 3, 1905.

3 SHEETS—SHEET 3.

Witnesses
Benj. Finckel
Alice B. Cook

Inventor
William Bauermeister
by Finckel & Finckel
his Attorneys

UNITED STATES PATENT OFFICE.

WILLIAM BAUERMEISTER, OF COLUMBUS, OHIO.

MACHINE FOR USE IN THE MANUFACTURE OF CHAIN-LINKS.

No. 838,069.　　　　Specification of Letters Patent.　　　　Patented Dec. 11, 1906.

Application filed November 3, 1905. Serial No. 285,706.

*To all whom it may concern:*

Be it known that I, WILLIAM BAUERMEISTER, a citizen of the United States, residing at Columbus, in the county of Franklin and State of Ohio, have invented certain new and useful Improvements in Machines for Use in the Manufacture of Chain-Links; and I do hereby declare the following to be a full, clear, and exact description of the invention, such as will enable others skilled in the art to which it appertains to make and use the same.

Heretofore the links of standardized chain have been straightened and stretched to the desired internal diameter by means of a die containing a tapering punch upon which the link while in a hot state and after welding was driven.

The object of the present invention is to provide improved means for stretching or both straightening and stretching the link.

It is also an object of the invention to combine the means for stretching or both stretching and straightening with means for welding in such wise or by such means that the lever or device for putting into operation the welding-die may be used for putting into operation the link-stretching devices.

The invention consists in the construction and combinations of parts hereinafter described and claimed.

Figure 1:
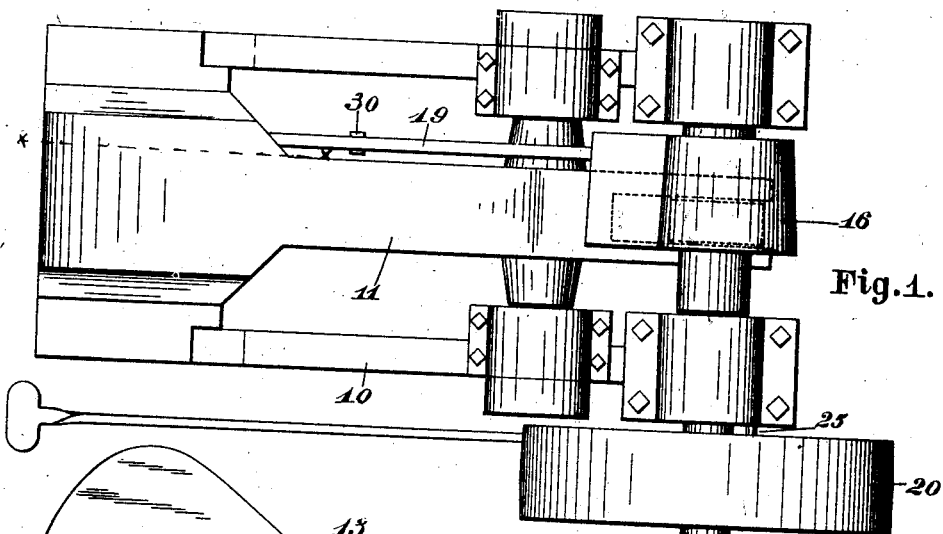
Figure 2:
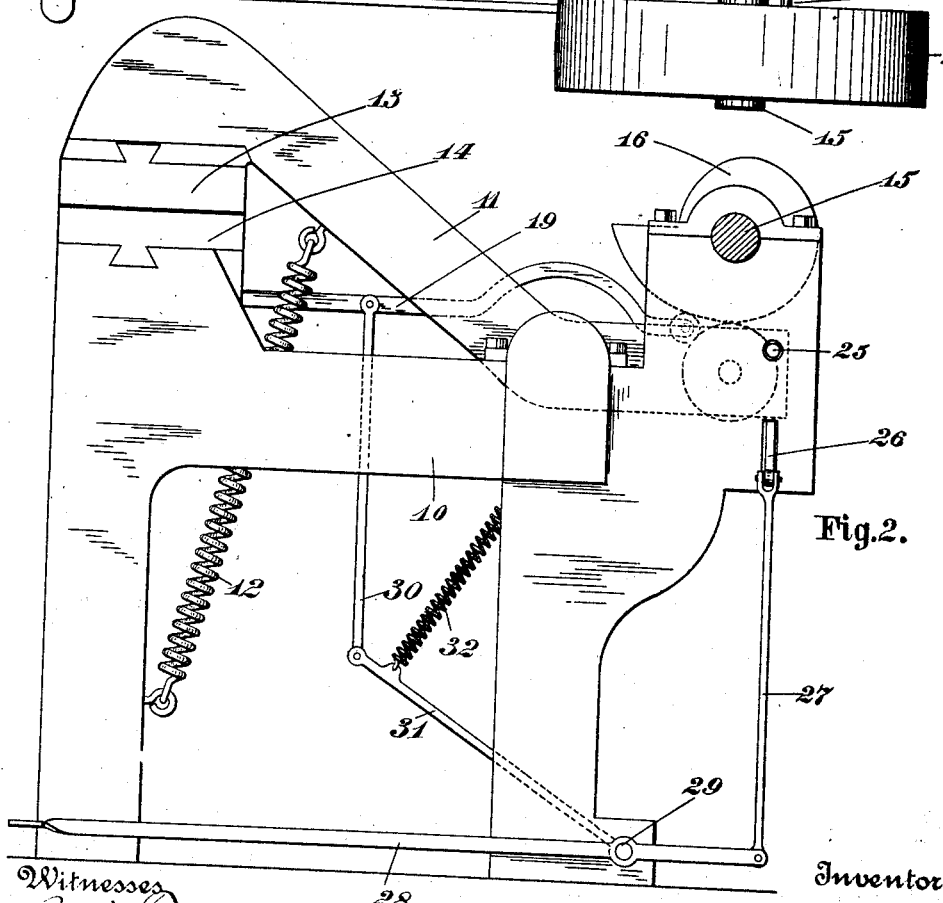
Figure 5:
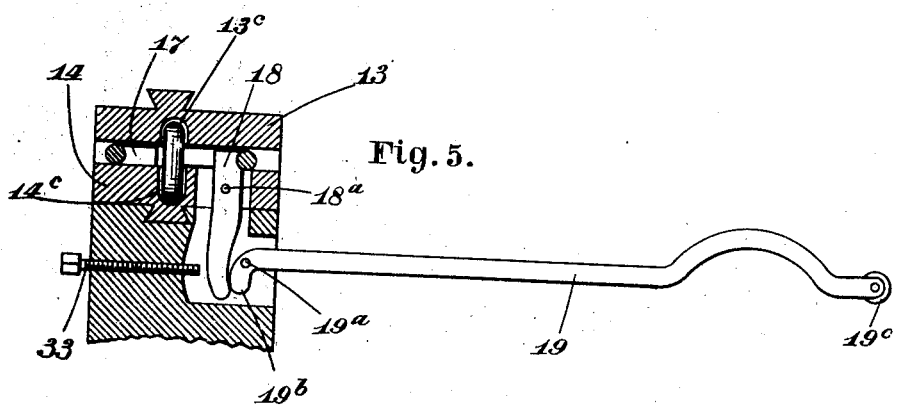
Figure 6:
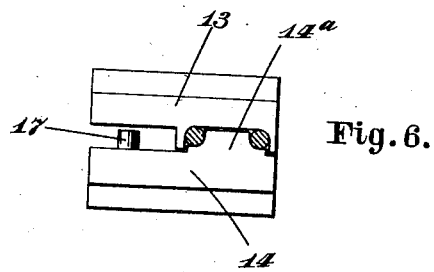
Figure 7:
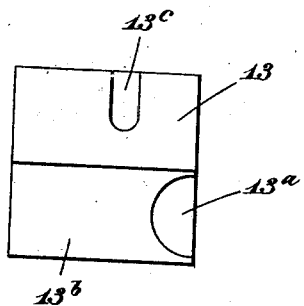
Figure 8:
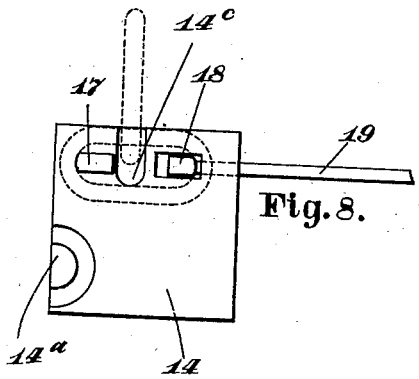

In the accompanying drawings, which show but one embodiment of the invention, Figure 1 is a top plan view. Fig. 2 is a side elevation with the driving-wheel and clutch removed. Fig. 3 is a rear elevation with a portion of the frame broken out to show the clutch-releasing pin. Fig. 4 shows the driving-wheel and clutching device therein with the clutch-bolt thrown out. Fig. 4ª is a similar view with the clutch-bolt drawn in. Fig. 4ᵇ is a sectional view of the loose pulley, showing in edge view the clutching devices. Fig. 5 illustrates the stretching devices, together with the coöperating straightening-face of the hammer die-block, the section being taken in the line *x x*, Fig. 1. Fig. 6 is a front view of the hammer and anvil die-blocks, a link being shown in section between the welding portions of the blocks. Figs. 7 and 8 show in plan view the operative faces of the upper and lower die-blocks, respectively.

In the several views, 10 designates a suitable frame upon which the operative parts are mounted.

11 designates the hammer-lever, which is fulcrumed to rock, as usual, in suitable bearings on the frame.

12 designates a coiled spring that connects the forward portion of the hammer-lever and the frame to increase the power of the down-stroke of the hammer. The head of the lever has keyed to it the hammer die-block 13, appropriately formed on its face to perform the work required of it, as hereinafter described.

14 designates an anvil die-block which is keyed to the frame and has its face formed to coöperate with the die-block 13. The rear arm of the hammer-lever is provided with an antifriction-roller 11ª, as usual.

15 designates a driven shaft mounted on the rear of the frame above the rear arm of the hammer-lever. This shaft has secured to it a cam 16, preferably volute in cross-section and adapted when rotated to act on the antifriction-roller in the rear arm of the hammer-lever, so as to depress that arm and raise the hammer-head, but permit the hammer-head to drop when the high point of the cam leaves the antifriction-roller. The cam 16 is made tapering from the portion that operates the hammer-lever to the portion that operates the stretcher, for the purpose hereinafter explained. The cam 16 is therefore, in effect, two cams.

The link-stretching device proper comprises a stationary or link-holding member 17, that projects above the face of the anvil die-block, and a movable or vibrating member 18, which may be denominated a "die-lever," consisting, as shown, of a short lever fulcrumed on a pin 18ª in a slot in the anvil-die. The upper end of the lever 18 constitutes a die and projects above the face of the anvil die-block about the same distance as the stationary member 17. The height of projection of the members 17 and 18 is preferably a little less than the thickness of the bar of metal of which the link is formed, so that the straightening-surface of the hammer-die can descend on the link without contact with the stretching-dies. The lower arm of the lever 18 projects downward into the frame below the lower side of the anvil-die.

19 designates a long lever fulcrumed at its forward end at 19ª in the frame below the hammer-die and having at that end a cam 19ᵇ to act on the lower arm of the die-lever 18. Rocking of the long lever 19 vibrates the die-lever 18. The long lever 19 reaches rearward to a point under the smaller end of the cam 16, so as at the proper time to be acted on by said cam. The rear end of the long lever 19 where it is acted on by the cam is preferably furnished with an antifriction-roller 19ᶜ.

20 designates a belt-pulley that normally runs loose on the shaft 15. This pulley is hollow at one side, and the inner side of the diametrically opposite edges of its rim are cut away with gradually-deepening recesses 20ᵃ, that terminate in shoulders 20ᵇ, as shown. Within the cavity of the belt-pulley and secured to the shaft 15 is a disk 21, having a radially-extending case 21ᵃ, in which slides a clutch-bolt 22. The clutch-bolt 22 has two pins 22ᵃ, that project laterally through a radial slot 21ᵇ in the wall of the case 21ᵃ. Pivoted at 23ᵃ on the face of the disk 21 is one end of a dog 23, having a cam edge 23ᵇ, while the other end of said dog lies between the pins 22ᵃ of the clutch-bolt 22. A spring 24 presses against the inner side of the dog 23, so as to throw the clutch-bolt outward and into position to be engaged by one or the other of the shoulders 20ᵇ of the belt-pulley as the latter revolves.

25 designates a pin that is slidable horizontally in a seat in the side of the frame toward and from the disk 21, so that its outer end can be projected into the path of the cam edge of the dog 23 for the purpose of releasing the clutch-bolt 22 from the driving-pulley. The inner end of the pin 25 is hinged to one end of a bell-crank lever 26, that is fulcrumed at 26ᵃ on the frame, and the other end of the bell-crank lever 26 is connected, by means of a link 27, with the rear extremity of a foot-lever 28, secured to a shaft 29, supported by and between the rear legs of the frame. The forward end of the foot-lever 28 extends to a point near the front of the machine and where it can be reached by the man using the machine.

The long lever 19, that operates the movable or vibratable member of the link-stretching device is connected with the shaft 29 by means of a rod 30, hingedly connected to said long lever and to the upper end of an arm 31, that is secured at its lower end to the shaft 29. A spring 32, connecting the arm 31 and the frame 10, tends to hold the rear portion of the lever 19 up with the antifriction-roller toward the cam and the pin 25 inward with its outer edge in the path of the cam edge of the dog 23. Therefore to clutch the belt-pulley to the shaft 15 when the latter is to be driven the foot-lever 28 will be depressed at its forward end sufficiently to withdraw the end of the pin 25 from the path of the cam edge of the dog 23. It will be borne in mind from the construction described that a slight depression of the forward end of the foot-lever 28 completely withdraws the pin 25 from the path of the cam edge of the dog 23 and that a further depression of said lever draws down the inner arm of the link-stretcher-operating lever 19 and that because the portion of the cam 16 that effects the operation of said lever 19 is of smaller radius than that portion which effects the operation of the hammer-lever the said lever 19 may be withdrawn entirely from the range of action of the smaller portion of the cam 16, while the hammer remains within the range of the action of that cam. The hammer may therefore be operated without operating the stretcher, or both may operate simultaneously.

In performing the operation of welding the link it is unnecessary to operate the stretcher, so the operator will depress the foot-lever sufficiently to remove the stretcher-operating lever 19 beyond the range of action of that portion of the cam which operates it, and when he desires to stretch the link he will permit the foot-lever to rise until the inner end of the stretcher-operating lever is within the range of action of the cam. The cam can of course be made in two separate parts, one to act on the hammer and the other to act on the stretcher; but for convenience in manufacture they are made as one piece or casting.

The hammer and anvil die-blocks are made conveniently broad enough to contain both the welding and straightening surfaces. The hammer die-block is provided with a recess 13ᵃ, the surfaces of which coöperate with the projection 14ᵃ on the anvil die-block to weld and rough-shape the ends of the link-blank, and the hammer die-block also has a flat surface 13ᵇ, adapted to descend on and straighten the welded link when it is placed over the stretching devices; but if the link is only to be stretched and not to be straightened that portion of the hammer-die containing the straightening-surface 13ᵇ can be omitted. Recesses 13ᶜ and 14ᶜ are also provided for the reception of the link that is connected with the link being stretched.

An adjustable set-screw 33 in the frame can be used to limit the link-stretching throw of the die-lever 18, and if the throw be slight the arm 19 may be slightly flexed under the action of the cam that operates said lever; but if this flexing should prove undesirable an operating-cam of appropriate radius can be substituted for that on the machine.

In practice the open link or link-blank being duly heated as usual is first welded on the part 14ᵃ of the anvil-die by one or more blows of the hammer-die, and then while the hammer-die is in elevated position the link is transferred to and placed over the stretching devices. After the welding operation the link is usually left in a state of more or less distortion, which may be removed by the impact of the flat portion 13ᵇ of the hammer-die, which for that purpose descends upon the link while on the link-stretching devices.

The arrangement of the cam on the shaft with respect to the dog 23 is preferably such that when the shaft is to be unclutched the pin 25 will stop the shaft by contact of the case 21ᵃ with said pin and cam in that position where the hammer is held at its extreme high position. The position of the cam 16 with respect to the position of the pin 25 is indicated by broken lines in Figs. 4 and 4ᵃ.

What I claim, and desire to secure by Letters Patent, is—

1. In a machine for use in the manufacture of chain-links, a link-stretching device comprising a support for the link, a link-holding member fixed to said support, a movable link-stretching member pivoted to said support and adapted to enter the link and engage the inner surface thereof, and means for actuating the link-stretching member, the said device adapted to receive the separate links to be stretched and act thereon independently of the adjoining links.

2. In a machine for use in the manufacture of chain-links, a link-stretching device comprising a link-holding member, a movable link-stretching member adapted to enter the link and engage the inner surface thereof, means for actuating the link-stretching member, and an adjustable stop for limiting the movement of the link-stretching member.

3. In a machine for use in the manufacture of chain-links, a link-stretching device including a support for the link, a stationary link-holding member on said support, a vibratable link-stretching member pivoted to said support, a lever to actuate the vibratable member, and a cam to actuate said lever.

4. In a machine for use in the manufacture of chain-links, a link-stretching device including a support for the link, a movable link-stretching member, a link-holding member adapted to coöperate with the said movable link-stretching member to stretch the link, means for operating said movable member, and a hammer-die adapted to act upon the link to straighten the same while on the stretching device.

5. In a machine for use in the manufacture of chain-links, a support for the link, a link-stretching device comprising a link-holding member, a movable link-stretching member coöperating with said link-holding member and adapted to enter the link and engage the inner surface thereof, the said members adapted to engage the separate links to be stretched and act thereon independently of the adjoining link, a hammer and operating-shaft therefor, and devices connected with said shaft for operating the movable link-stretching member.

6. In a machine for use in the manufacture of chain-links, the combination of an anvil and a hammer for straightening the link, a cam for operating the hammer, means for stretching the link comprising a stationary member fixed to said anvil, a movable link-stretching member pivoted to said anvil, a cam for operating said movable member, and means adapted to put the movable member out of range of action of its cam, said means being also adapted to put into and take out of action the cam for operating the hammer.

In testimony whereof I affix my signature in presence of two witnesses.

WILLIAM BAUERMEISTER.

Witnesses:
 OLIN J. ROSS,
 BENJ. FINCKEL.